United States Patent
Kobayashi et al.

[19]

[11] Patent Number: 5,804,111
[45] Date of Patent: Sep. 8, 1998

[54] EXTRUSION METHOD FOR REMOVING VOLATILE CONTENTS FROM SOLID STATE RESIN MATERIALS AND APPARATUS THEREFOR

[75] Inventors: Akiyoshi Kobayashi; Junya Ishibashi, both of Shizuoka, Japan

[73] Assignee: Toshiba Machine Co., Ltd., Tokyo, Japan

[21] Appl. No.: 622,457

[22] Filed: Mar. 22, 1996

[30] Foreign Application Priority Data

Mar. 24, 1995 [JP] Japan ................................... 7-066387

[51] Int. Cl.$^6$ ............................ B29C 47/50; B29C 47/92
[52] U.S. Cl. ...................... 264/40.5; 264/40.6; 264/40.7; 264/102; 264/211.23; 425/144; 425/149; 425/203; 425/205
[58] Field of Search ................................ 264/40.5, 40.6, 264/40.7, 101, 102, 211.23; 425/144, 149, 203, 204, 205, 376.1

[56] References Cited

U.S. PATENT DOCUMENTS

| | | | |
|---|---|---|---|
| 3,481,001 | 12/1969 | Stillhard | 425/205 |
| 4,063,718 | 12/1977 | Koch | 425/205 |
| 4,070,138 | 1/1978 | Stanwood | 425/376.1 |
| 5,080,845 | 1/1992 | Herrmann et al. | 425/204 |
| 5,102,594 | 4/1992 | Burlet et al. | 425/204 |
| 5,338,112 | 8/1994 | Boden et al. | 425/203 |
| 5,468,429 | 11/1995 | Li et al. | 425/205 |

*Primary Examiner*—Mathieu D. Vargot
*Attorney, Agent, or Firm*—Fish & Richardson P.C.

[57] ABSTRACT

An extrusion method and apparatus for removing volatile contents from solid state resin materials is described. A cascade-type extruding device is used having first and second extruders. A top end portion of the first extruder 10 is directly connected to a rear side portion of a cylinder of the second extruder 100. Volatile contents of a melted resin, which is melted when the solid state resin material is supplied to the first extruder, are removed in a volatile content removing vacuum unit provided on an upstream side of the connection between the first and second extruders. The melted resin is then extruded from a nozzle provided at a top end portion of the second extruder. The volatile content removing vacuum region of the volatile content removing vacuum unit 140 extends over a first region, which is under the control of the first extruder, and a second region, which is under the control of the second extruder. The pressure and temperature of the melted resin in the first region are controlled in accordance with the properties of the melted resin.

19 Claims, 6 Drawing Sheets

EXTRUSION METHOD FOR REMOVING VOLATILE CONTENTS FROM SOLID STATE RESIN MATERIALS AND APPARATUS THEREFOR

BACKGROUND OF THE INVENTION

1. Field of the Invention

The invention relates to an extrusion method for removing volatile contents such as monomer, solvent, and moisture from solid state resin materials and an apparatus therefor. More particularly, the invention relates to an extrusion method and apparatus for removing the volatile contents from solid state resin materials having high concentrations of volatile contents.

2. Related Art

There are two types of methods known for removing volatile contents from a resin material. One type uses an extruder having a screw while the other type uses a tank having a churning impeller. The first method is more popular because material deterioration is reduced and the volatile content removing efficiency is high. The following explanation is for such an apparatus having an extruder for removing volatile contents from resin materials.

FIG. 1 shows the construction of an extruding apparatus having a single extruder 10 used to remove the volatile contents from general solid state resin material. The extruder 10 comprises a screw 14 which is contained in a cylinder 12. Solid state resin material is supplied from a feeder 16 to change the solid state resin material to a melted resin; the melted resin is then extruded from a nozzle 18 after the volatile contents thereof have been removed. Four vacuum seals 20a–20d are disposed in the cylinder 12 defining four downstream side vacuum regions 22a to 22d in which volatile contents are removed. One of four volatile content removing vacuum units 26a to 26d is disposed in each of the vacuum regions 22a to 22d. The units 26a to 26d comprise volatile contents removing openings 24a to 24d, respectively. Reference numeral 28 designates a region where the solid state resin material is mainly plasticized and melted. Reference numeral 30 denotes a water-injecting unit for generating water vapor for foaming the resin, and reference numeral 32 denotes a heater by which the temperature of the resin material is controlled via a wall of the cylinder 12.

The apparatus shown in FIG. 2 is used to remove the volatile contents from a liquid state resin material. The apparatus also comprises a single extruder the same as the apparatus shown in FIG. 1. This apparatus comprises a feeder 34 for supplying a liquid state resin material and an upstream volatile content removing unit 40. The feeder 34 and the unit 40 corresponds to the feeder 16 for supplying the solid state resin material 16 and the plasticizing and melting region 28 in the apparatus shown in FIG. 1, respectively.

The liquid state resin material is first polymerized in a reactor 34a and then moved into feeder 34 where, after preheating, volatile contents thereof are removed in a volatile content removing tank 34b. The material is then released into a vacuum volatile content removing region 36 via a connecting tube 34e, a gear pump 34c, and a flashing nozzle 34d. The upstream volatile content removing unit 40 includes the volatile content removing vacuum region 36 and a volatile content removing opening 38, which is disposed on the upstream side of the flashing nozzle 34d in the extruding direction of the screw 14.

The apparatus shown in FIG. 2 may be used for removing volatile contents from other specific liquid state resin materials. In the apparatus shown in FIG. 3, there are provided first and second extruders 10 and 100, but the volatile content removing tank 34b is omitted. In this apparatus, a liquid state resin material including highly concentrated volatile contents is supplied directly from the reactor 34a to the first extruder 10 without going through the volatile content removing tank 34b. The material is then sent to the second extruder 100 via a connecting tube 50 and a control valve 52 under the condition that the temperature of the material is kept constant. The highly concentrated volatile contents are removed from the material in the volatile content removing vacuum unit 126 through the opening 124.

In the case where a specific liquid state resin material having a high concentration of volatile contents and high viscosity is supplied to the apparatus shown in FIG. 2, the resin material will remain on the inside wall of the tank 34b during the preheating and volatile content removing steps in the tank 34b, so that some problems, such as a heat deterioration of the material, are caused. In contrast thereto, in the apparatus shown in FIG. 3, such a problem is not created.

The apparatus shown in FIG. 4 is another known device used to remove the volatile contents from general solid state resin material. The apparatus shown in FIG. 4 comprises two extruders, i.e., a first extruder 10 and a second extruder 100. An inlet 42 is provided in a front portion of the first extruder 10 for introducing extractant gas used to separate the volatile contents from the resin material.

In this apparatus, solid state resin material is supplied from the feed 16 of the first extruder 10 to alter the resin material to a melted state; the extractant gas is supplied from the pressure inlet 42 to be mixed with the melted resin; then the thus mixed material is introduced into the second extruder 100 via the connecting pipe 50 and the control valve 52. In the second extruder 100, the volatile contents are removed from the melted resin and the extractant gas is exhausted by the volatile content removing vacuum units 140 and 126 (via the openings 138 and 124), which are arranged on the upstream side and the downstream side from a connecting portion 44 of the first and the second extruders, respectively.

Operation of the volatile content removing vacuum units will now be explained.

In the vacuum unit provided in the apparatus shown in FIG. 1, most of the resin material going through the region 22a is not yet completely melted in the unit 26a which is disposed at the upstream-most side of the apparatus. This is because almost all of the power of the screw and the heat quantity given from the heater 32 are used to vaporize and remove the volatile contents from the material in the unit 26a. Thus, vacuum unit 26a exhibits poor performance.

If the quantity of heating of the heater 32 is increased, in other words, the temperature of the cylinder 12 is increased, in order to accelerate melting the material, most of the volatile contents are vaporized and removed in the plasticizing and melting regions 28. This causes material to flow backward to the feeder 16, checking the feed of the material. On the other hand, if the power of the screw 14 is increased, it causes a deterioration of the properties of the resin material because of heating of the screw 14 due to overshearing.

As stated above, this type of vacuum unit cannot perform suitably. Therefore, the apparatus shown in FIG. 1 having this type of vacuum unit has a problem that it actually can be applied only to resin material including volatile contents with low concentrations (several ten thousand p.p.m. or less).

Further, such an apparatus having a single extruder, even if it is applied to the resin material having comparatively low concentrated volatile contents, still has a problem in that the length of the apparatus is very long. Additionally, in such an apparatus, vent up or flak up of the material, caused by the unbalanced condition of the kneading and melting functions of the material and the volatile content removing function, cannot be prevented.

In the apparatus shown in FIG. 4, an upstream-type vacuum unit 140 is provided. The upstream-type vacuum unit 140 has the same construction as that of the unit 40 shown in FIG. 2, which is applied to remove the volatile contents of a liquid state resin material. As stated above, the unit 40 comprises a volatile content removing vacuum region 36 and an opening 38, which is disposed on the upstream side of the flashing nozzle 34d in the screw-extruding direction. The pressure of the liquid state resin material is released from the flashing nozzle 34d into the region 365.

In such a vacuum unit 40, no resin material exists between the flashing nozzle 34d and the opening 38 in the region 36. Even if some material remained there, it is fed back to the vacuum seal 20a side by the screw 14, so hardly any vent up or flak up of the resin material is caused between the flashing nozzle 34d and the opening 38. Vacuum unit 40 therefore exhibits acceptable operating characteristics.

The apparatus having double-acting extruders as shown in FIG. 4, in which the above type of vacuum unit is employed, is applicable to solid state resin material whose remaining volatile content is comparatively high (for instance, in the order of several hundred thousands of p.p.m.). However, the conventional apparatus for removing volatile content from a solid state resin material having double-acting extruders still has some problems as explained below.

First, in the conventional apparatus, since the extruders are connected by the connecting pipe 50, the volatile contents separated from the material cannot pass through the connecting pipe 50, and thus the fused resin material adheres to the inside wall of the pipe 50. There is a possibility that the gas remaining in the pipe 50 will be passed back to the feeder 16 side. Further, the material is deteriorated by the resin adhering to the inside wall, and it becomes difficult to clean up the inside surface of the pipe 50.

Second, in the conventional apparatus, the extractant gas is supplied from the inlet 42, which is disposed on the first extruder 10. Therefore, it is necessary to separate the extractant gas again from the gas collected by the vacuum units 126 and 140, which are provided on the second extruder 100, in order to use the remaining volatile gas component of the resin material. However, it is very complicated to separate the extractant gas again.

Further, in the conventional apparatus, since the vacuum units are arranged only on the second extruder 100, the length of the second extruder 100 becomes long; as a result, the size of the apparatus as a whole becomes large.

SUMMARY OF THE INVENTION

The present invention provides an extruding method for removing volatile contents from a solid state resin material and an apparatus therefor by which comparatively highly concentrated volatile contents can be removed from solid state resin material with a high efficiency in a stable manner, and further the size of the apparatus can be made comparatively compact.

In one aspect, the invention relates to a method for removing volatile contents from solid state resin material during extrusion using a cascade-type extruding device having a first extruder and a second extruder, a top end portion of the first extruder communicating with a side portion of the second extruder comprising the steps of: supplying a solid state resin material to the first extruder to produce melted resin in a first region of the first extruder; controlling pressure and temperature of the melted resin in the first region; and removing volatile contents from the melted resin using means disposed on the second extruder upstream of the top end portion of the first extruder.

In another aspect, the invention relates to an extrusion apparatus for removing volatile contents from solid state resin material, comprising a first extruder; a second extruder disposed adjacent the first extruder, a top end portion of the first extruder communicating with the second extruder via an opening in a side portion of the second extruder; means for defining a first region within the first extruder extending upstream from the opening; a means for defining a second region within the second extruder, the second region upstream from the opening to an upstream position of the second extruder; a volatile content removing unit disposed at the upstream position of the second extruder; and a detecting means for detecting pressure and temperature of melted resin in the first region.

According to the extruding method for removing volatile contents from a solid state resin material and an apparatus therefor of the present invention, a cascade-type extruding device, in which the first and second extruders are directly connected to each other, is provided; the volatile content removing vacuum unit is disposed on an upstream side of the second extruder, and the volatile content removing region of the vacuum unit is set so as to extend over the first region, (which is under the control of the first extruder), and the second region, (which is under the control of the second extruder); the pressure and temperature of the melted resin material in the first region are controlled. Since a cascade-type extruding device is applied, the size of the apparatus as a whole can be made compact; and also the volatile content removing region is set so as to extend over the first and second regions, the volatile content removing efficiency of the volatile content removing vacuum unit can be improved; and further, since the pressure and the temperature of the fused resin material are controlled, it is possible to operate the apparatus in a stable manner.

DESCRIPTION OF THE PREFERRED EMBODIMENTS

Figure 4:
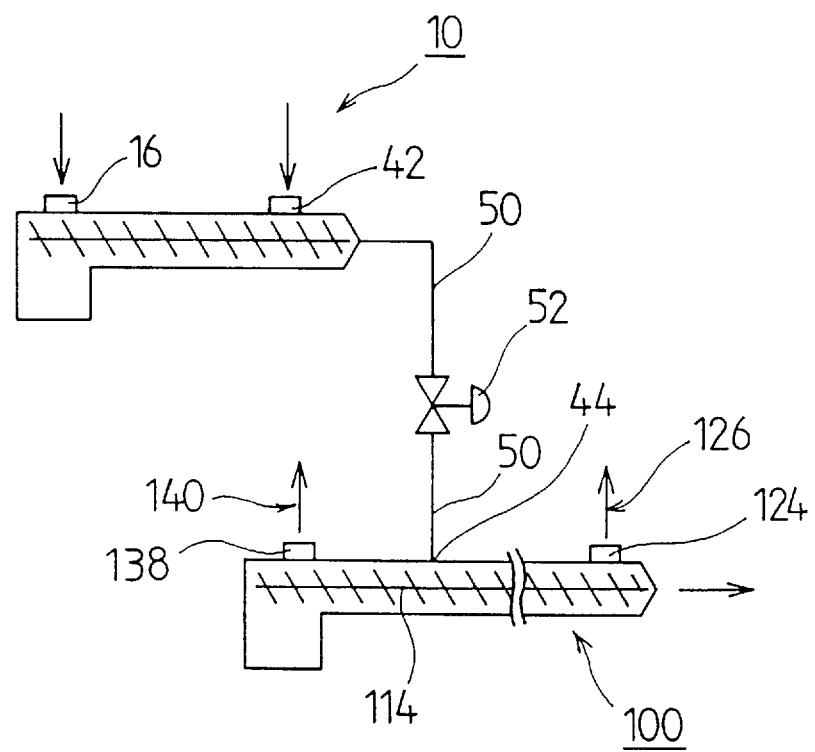
FIG. 4 is a cross-sectional view of a conventional apparatus having double extruders for removing volatile contents from solid state resin material.

Preferred embodiments of an extruding method and apparatus for removing volatile contents from solid state resin material according to the present invention will be explained below, referring to the attached drawings. It should be noted that the same numerical references are used for the same elements of the conventional apparatus shown in FIGS. 1 and 4, and the explanation of the elements is therefore omitted here.

Figure 5:
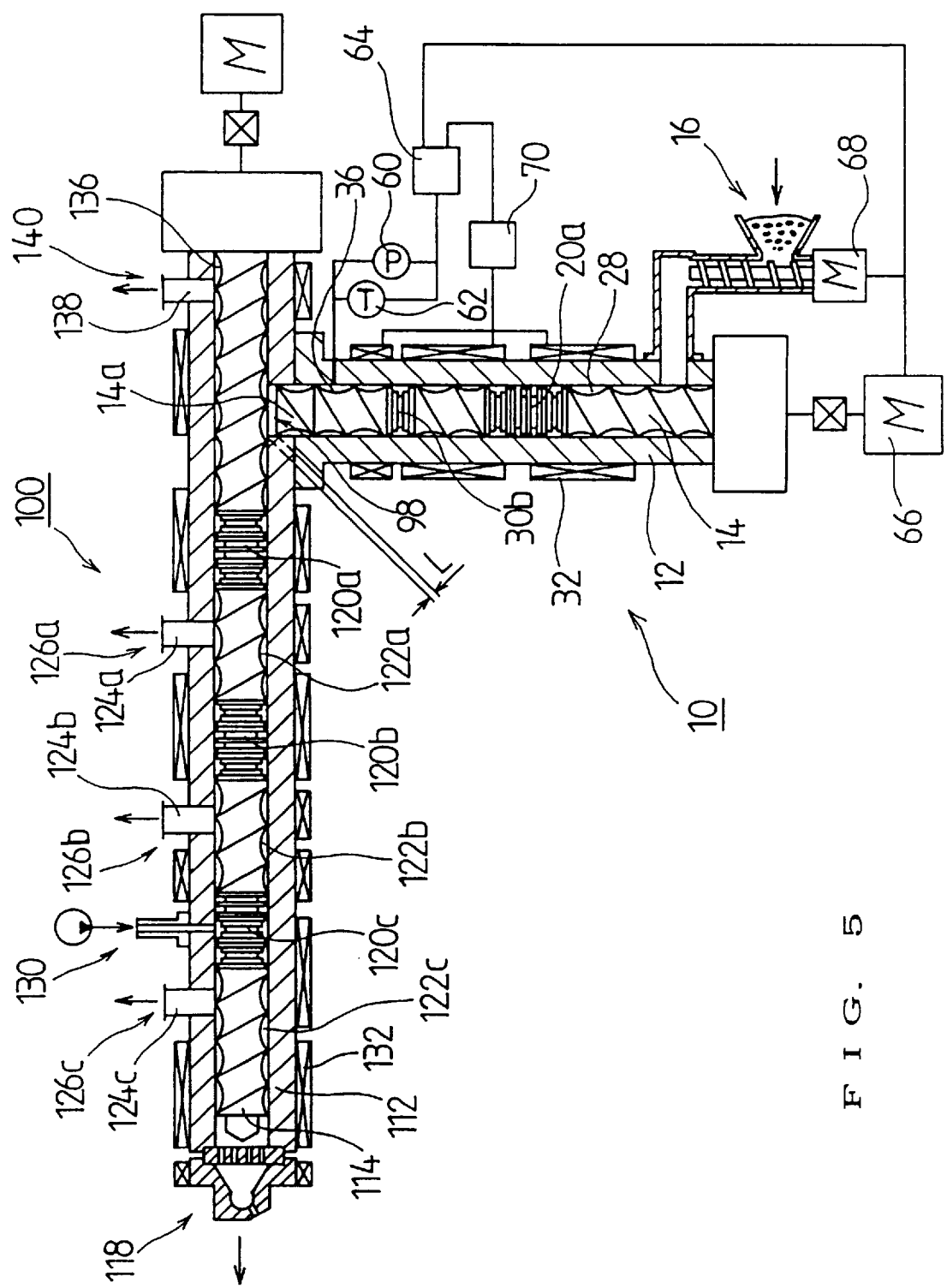
FIG. 5 is a cross-sectional view of an embodiment of the apparatus in which the extruding method for removing volatile contents from a solid state resin material according to the invention is carried out.

Referring to FIG. 5, the extruding apparatus for removing volatile contents from solid state resin materials according to the present invention comprises a cascade-type extruding device where a top end portion of a first extruder 10 is directly connected to a side portion of a rear portion of a second extruder 100. Extruders 10 and 100 have screws 14 and 114 which are contained in cylinders 12 and 112, respectively.

Solid state resin material is supplied from a feeder 16 of the first extruder, where the material is changed to a melted resin. The fused resin material is then supplied to the second extruder 100, and the volatile contents thereof are removed in a vacuum unit 140, which is arranged on the upstream side of a connecting portion 98 which connects the first and second extruders. Vacuum unit 140 is provided with volatile content removing vacuum opening 138, also located on the upstream side of the connecting portion 98. The resin, whose volatile content has been removed, is extruded from a nozzle 118 provided at a top end portion of the second extruder 100.

In the first extruder 10, a plasticizing and fusing region 28 is formed by a vacuum seal 20a. The length of the region 28 is preferably arranged to be 8 to 20 times longer than the diameter of the screw 14. In the second extruder 100, a water injection unit 130 is provided. Volatile content removing regions 122a to 122c, which are formed by vacuum seals 120a to 120c, respectively, are provided with volatile contents removing units 126a to 126c on the downstream side of the apparatus. The units 126a to 126c comprise openings 124a to 124c, respectively. The numerical references 32 and 132 represent first and second heaters, respectively.

The first and second extruders are connected together so as to form a right angle therebetween. The top end portion 14a of the screw 14 of the first extruder 10 is projected inside of the cylinder 112 of the second extruder 100, so that a distance L between the top end portion of the screw 14 of the first extruder and the outer periphery of the screw 114 of the second extruder is preferably 0.05 to 0.3 of the diameter of the screw 114 of the second extruder 100. It is preferred that the screw 14 of the first extruder 10 be arranged as a full flight type screw and/or the screw be provided on a kneading disk.

The volatile content removing vacuum region of the unit 140 provided on the upstream side of the apparatus is arranged so as to extend over both a first region 36, which is under the control of the first extruder (extending from the connecting portion 98 to the vacuum seal 20a), and a second region 136, which is under the control of the second extruder (extending from the opening 138 to the vacuum seal 120a). A pressure sensor 60 and a temperature sensor 62 for detecting the pressure and temperature of the fused resin are provided in the first region 36 in the vicinity of the connecting portion 98. A feedback control is applied to a driving motor 66 for driving the screw 14 of the first extruder 10, a driving motor 68 for driving the feeder 16, and/or a thermoregulator 70 of the heater 32 in accordance with the detected pressure and temperature of the melted resin.

Preferably region 36 is arranged such that the length thereof becomes at least longer than the diameter of the screw 14 of the first extruder. Also, at least one assistant kneading element 30b is provided in the first region 36 as occasion demands. It also may be desirable to arrange a plurality of pressure sensors 60 and a plurality of temperature sensors 62a as occasion demands.

In the apparatus according to the present invention, the driving condition of the apparatus is monitored and an optimum management therefore can be conducted as explained below.

First, the inner pressure of the cylinder 12 of the first extruder 10 detected by the pressure sensor 60 indicates the repletion condition of the resin material inside the cylinder 12. In this case, in order to optimize (maximize) the volatile content removing efficiency of the vacuum unit 140 on the upstream side, it is important that the degree of the repletion of the resin material in the cylinder 12 be low. Thus, vacuum sealing is not applied. It is also important that the volatile content removing region 36 is not made to be too small.

Figure 6A:
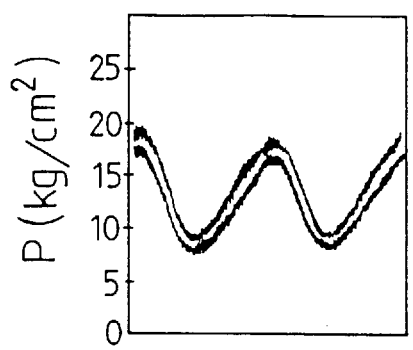
FIGS. 6($a$) and 6($b$) are graphs depicting a pressure characteristic in the first region of the volatile content removing unit in the upstream side of the apparatus shown in FIG. 5.
Figure 6B:
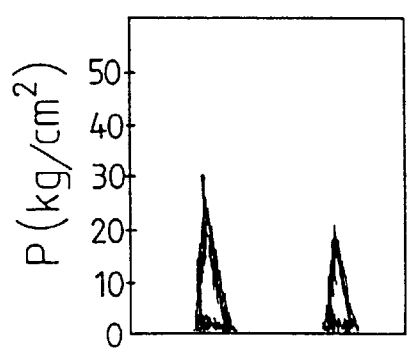

FIGS. 6(a) and 6(b) are graphs showing waveforms of actually measured pressures of the cylinder 12. In FIG. 6(a), a condition is shown where the volatile content removing efficiency is low in the vacuum unit 140 due to a high degree of repletion of the resin material in the cylinder 12. FIG. 6(b) depicts a condition where the volatile content removing efficiency is high because of the low degree of repletion of the resin material in the cylinder 12. The operator can manage the driving condition of the apparatus in an optimum manner by monitoring the waveforms of the pressure obtained from the pressure sensor 60 and displayed on a pen recorder or a computer monitor.

In order to keep the driving condition of the apparatus at an optimum point, the number of revolutions of the screw 14 should be increased so that the degree of repletion of the resin material in the cylinder 12 is decreased. Or, if it is impossible to increase the number of revolutions of the screw 14 because the temperature of the resin material is too high, the amount of material to be supplied from the feeder should be reduced. Because the temperature of the resin material varies according to the above-mentioned operation of the pressure in the cylinder, the temperature of the resin should be monitored and managed in accordance with the temperature detected by the sensor 62. Automatic control these monitoring procedures may be achieved using a comparator for comparing the measured waveforms with optimum standard waveforms.

Figure 1:
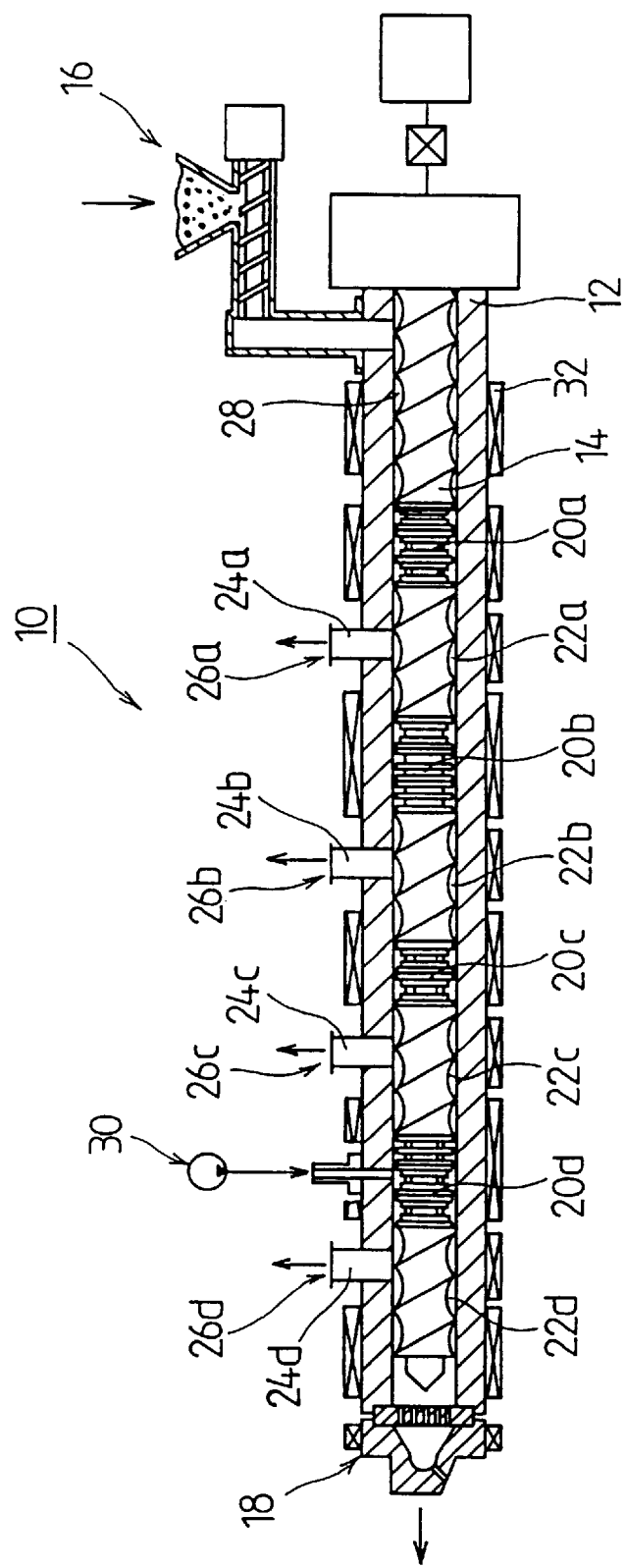
FIG. 1 is a cross-sectional view of a conventional apparatus having a single extruder for removing volatile contents from solid state resin material.
Figure 2:
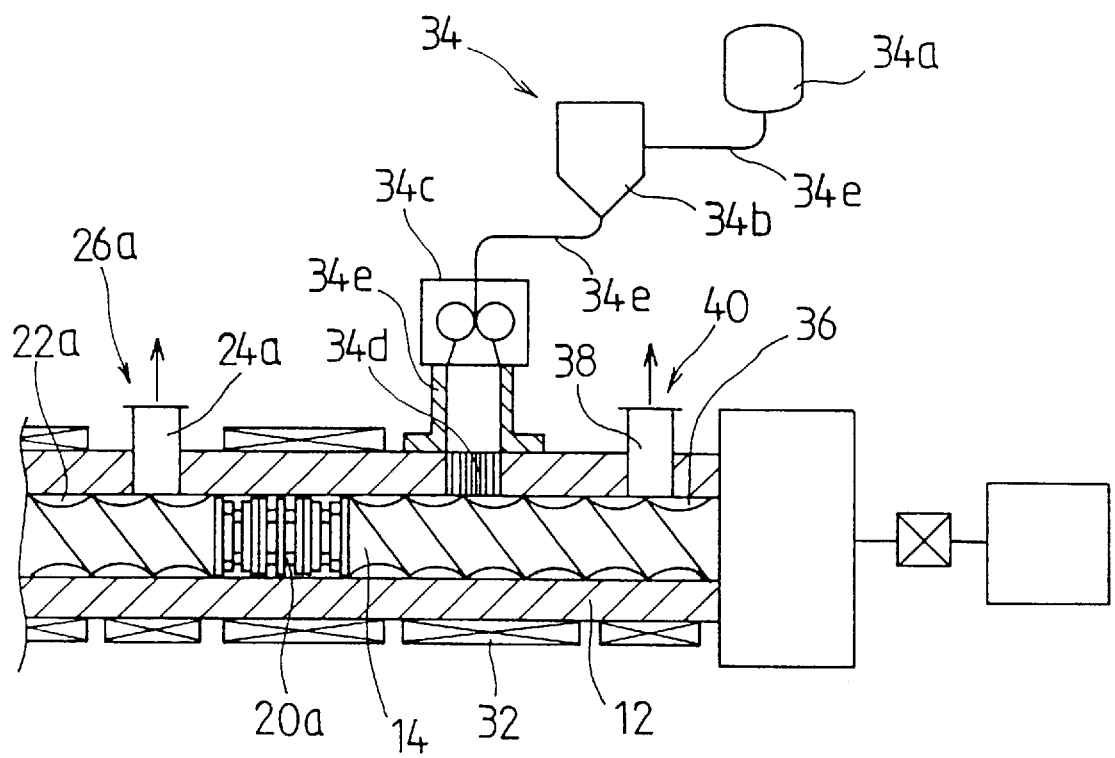
FIG. 2 is a cross-sectional view of a conventional apparatus having a single extruder for removing volatile contents from liquid state resin material.
Figure 3:
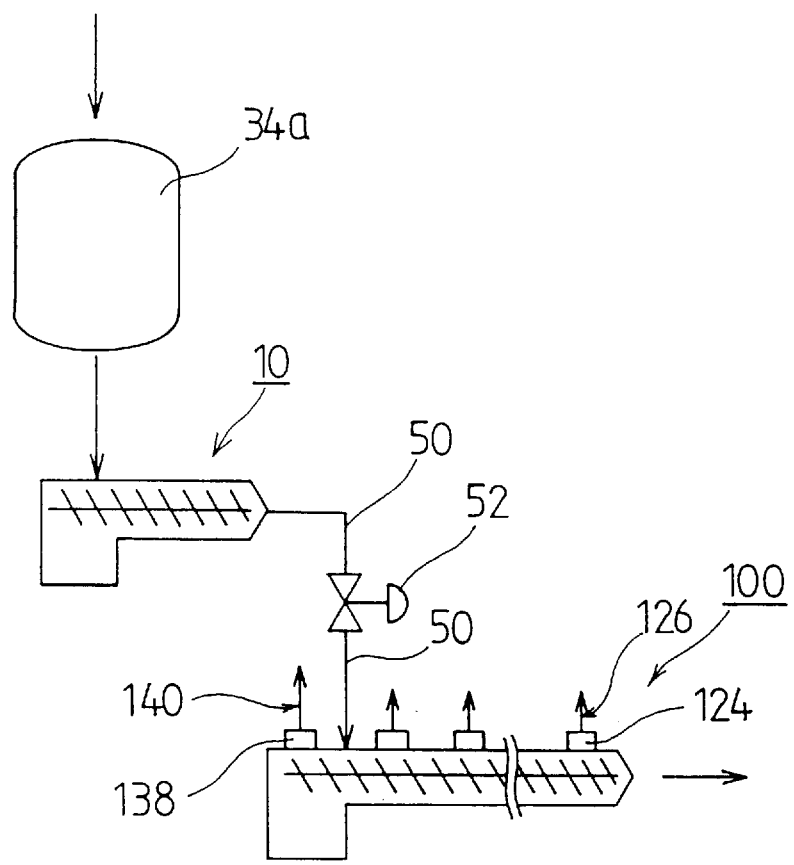
FIG. 3 is a cross-sectional view of a conventional apparatus having double extruders for removing volatile contents from liquid state resin material.

Table 1 lists actual driving values of the conventional extruding apparatus having a single extruder shown in FIG. 1 and of the cascade-type extruding apparatus according to the present invention and shown in FIG. 5. The values are obtained using four volatile contents removing vacuum units 26a to 26d and a water injection unit 30 on the downstream side of the conventional apparatus. For the apparatus of the invention, the values were obtained using the volatile contents removing vacuum unit 140 disposed on the upstream side, and four volatile contents removing vacuum units 126a to 126b and a water injection unit 130 on the downstream side. General type twin screw extruders were used on both apparatii. An engineering plastic series resin including 400,000 ppm of remaining volatile contents (solvent) therein was used as the resin material.

TABLE 1

|  | Moving Speed of Second Extruder | Extrusion Amount | Resin Temperature at Outlet of Second Extruder | Volatile Content included in Resin Material | Amount of Volatile Content remained in Product |
|---|---|---|---|---|---|
| Apparatus having a single extruder | 300 rpm<br>450 rpm | 30 kg/H<br>50 kg/H | 325° C.<br>245° C. | 400,000 ppm<br>400,000 ppm | 7,000 ppm<br>5,000 ppm |
| Apparatus having a cascade type extruders | 300 rpm<br>450 rpm | 30 kg/H<br>50 kg/H | 320° C.<br>330° C. | 400,000 ppm<br>400,000 ppm | 500 ppm<br>900 ppm |

As is apparent from the data presented in Table 1, the desired output cannot be achieved with the conventional apparatus because flaking of the resin material occurs. Particularly, in the first to third volatile contents removing units 26a to 26c, major flaking is generated, so that the volatile content removing efficiency is decreased. Further, in the conventional apparatus, the temperature of the resin material becomes extremely high during the operation and, as a result, the properties of the resin, such a depolymerization, deteriorate. On the other hand, in the apparatus according to the invention, no flaking occurs in the resin material, and thus the desired values can be obtained under stable operating conditions without causing deterioration in the properties of the resin. Furthermore, according to the invention, the range of driving conditions is large, so the apparatus can be applied to many different types of resin material.

As explained above, the apparatus according to the present invention can be applied to solid state resin materials having high concentrations of volatile contents, because the volatile content removing efficiency is improved and the operation of the apparatus can be conducted in a stable manner. Further, since a general cascade-type extruder can be used in the apparatus, it has a further advantage that the size of the apparatus as a whole can be made compact.

Preferred embodiments have been shown and described. However, the invention is not so limited. Rather, the scope of the invention is defined only by the appended claims.

What is claimed is:

1. A method for removing volatile contents from solid state resin material during extrusion using a cascade-type extruding device having a first extruder and a second extruder, a top end portion of the first extruder communicating with a side portion of the second extruder, comprising the steps of:
   supplying a solid state resin material to said first extruder to produce melted resin in a first region of said first extruder;
   controlling pressure and temperature of said melted resin in said first region;
   supplying said melted resin in said first region to a second region of said second extruder; and
   removing volatile contents from said melted resin in both said first region and said second region using means disposed on the second extruder upstream of the top end portion of the first extruder.

2. The method of claim 1, wherein said pressure and said temperature of said melted resin in said first region are controlled by controlling the number of revolutions of a screw in said first extruder.

3. The method of claim 1, wherein said pressure and said temperature of said melted resin in said first region are controlled by controlling temperature of said first extruder.

4. The method of claim 2, wherein said pressure and said temperature of said melted resin in said first region are controlled by controlling temperature of said first extruder.

5. The method of claim 1, wherein said pressure and said temperature of said melted resin in said first region are controlled by controlling an amount of resin material supplied to said first extruder.

6. The method of claim 2, wherein said pressure and said temperature of said melted resin in said first region are controlled by controlling an amount of resin material supplied to said first extruder.

7. The method of claim 3, wherein said pressure and said temperature of said melted resin in said first region are controlled by controlling an amount of resin material supplied to said first extruder.

8. An extrusion apparatus for removing volatile contents from solid state resin material, comprising:
   a first extruder comprising a screw;
   a second extruder disposed adjacent said first extruder, wherein a top end portion of said screw of said first extruder projects inside an opening in a side portion of a cylinder of said second extruder;
   means for defining a first region within said first extruder extending upstream from said opening;
   means for defining a second region within said second extruder, said second region upstream from said opening to an upstream position of said second extruder;
   a volatile content removing region comprising said first region and said second region;
   a volatile content removing unit disposed at said upstream position of said second extruder; and
   detecting means for detecting pressure and temperature of melted resin in said first region.

9. The apparatus of claim 8, further comprising means for controlling pressure and temperature of the melted resin in said first region.

10. The apparatus of claim 8, wherein said volatile content removing unit comprises a volatile content removing vacuum unit, and wherein a volatile content removing vacuum region of said vacuum unit extends over said first and said second regions.

11. The apparatus of claim 8, wherein said first and said second extruders are connected to form a right angle therebetween.

12. The apparatus of claim 8, wherein said second extruder comprises a screw, and wherein the distance between a periphery of said screw of said second extruder and said top end portion of said screw of said first extruder is in the range of 0.05 to 0.3 times a diameter of the screw of said second extruder.

13. The apparatus of claim 8, wherein said top end portion of said screw of said first extruder is a full flight type screw.

14. The apparatus of claim 8, wherein said top end portion of said screw comprises a kneading disk.

15. The apparatus of claim 8, wherein a fusing region is defined within said first extruder extending from a position where resin material enters said first extruder to said first region, said fusing region being in the range of 8 to 20 times a diameter of a screw of said first extruder.

16. The apparatus of claim 15, wherein said first region is longer than the diameter of the screw of said first extruder.

17. The apparatus of claim 16, further comprising at least one assistant kneading element provided within said first region.

18. The apparatus of claim 8, further comprising an additional volatile content removing unit disposed between said opening and a nozzle of said second extruder.

19. The apparatus of claim 8, further comprising a water injecting unit disposed between said opening and a nozzle of said second extruder.

* * * * *